US009384592B2

(12) United States Patent
Smout et al.

(10) Patent No.: US 9,384,592 B2
(45) Date of Patent: Jul. 5, 2016

(54) IMAGE PROCESSING METHOD AND APPARATUS PERFORMING SLAB MULTI-PLANAR REFORMATTING RENDERING OF VOLUME DATA

(75) Inventors: Andrew Michael Christian Smout, Edinburgh (GB); Daniel Neil William Phillips, Edinburgh (GB)

(73) Assignees: KABUSHIKI KAISHA TOSHIBA, Tokyo (JP); TOSHIBA MEDICAL SYSTEMS CORPORATION, Otawara-shi (JP)

( * ) Notice: Subject to any disclaimer, the term of this patent is extended or adjusted under 35 U.S.C. 154(b) by 484 days.

(21) Appl. No.: 13/427,219

(22) Filed: Mar. 22, 2012

(65) Prior Publication Data

US 2013/0249913 A1    Sep. 26, 2013

(51) Int. Cl.
*G06T 17/00* (2006.01)
*G06T 19/00* (2011.01)
*G06T 15/08* (2011.01)

(52) U.S. Cl.
CPC ............... *G06T 19/00* (2013.01); *G06T 15/08* (2013.01); *G06T 2210/41* (2013.01)

(58) Field of Classification Search
None
See application file for complete search history.

(56) References Cited

U.S. PATENT DOCUMENTS

| 6,211,884 | B1* | 4/2001 | Knittel et al. | 345/424 |
| 6,559,843 | B1* | 5/2003 | Hsu | 345/421 |
| 2005/0207628 | A1* | 9/2005 | Kim | 382/128 |
| 2006/0114254 | A1* | 6/2006 | Day et al. | 345/424 |
| 2008/0024493 | A1* | 1/2008 | Bordoloi et al. | 345/423 |
| 2008/0246768 | A1* | 10/2008 | Murray et al. | 345/427 |

* cited by examiner

*Primary Examiner* — William Beutel
(74) *Attorney, Agent, or Firm* — Oblon, McClelland, Maier & Neustadt, L.L.P

(57) ABSTRACT

A computer implemented method of generating a succession of two-dimensional image frames for a slab cine multi-planar reformatting (MPR) process by advancing a slab through a volume defined by a volume data set, including receiving a volume data set defining a volume; specifying a view axis with respect to the volume; advancing a slab through the volume along the view axis in incremental step sizes smaller than the slab thickness; and determining at each slab position an MPR view by: selecting a plurality of sample points along each of a plurality of rays cast through the slab, and performing a projection of the sample points on to an image plane using an a projection function, wherein at least some of the sample points used for the overlap region are re-used from the previous slab position.

18 Claims, 14 Drawing Sheets

IMAGE PROCESSING METHOD AND APPARATUS PERFORMING SLAB MULTI-PLANAR REFORMATTING RENDERING OF VOLUME DATA

BACKGROUND OF THE INVENTION

The invention relates to image processing and in particular rendering of three-dimensional (3D) data, i.e. volume data. In particular, the invention relates to slab multi-planar reformatting rendering of volume data.

The process of calculating two-dimensional (2D) images of 3D objects is often referred to as volume rendering. Volume rendering finds applications in many fields. One such field is the rendering of medical volume data resulting, for example, from the scanning of the human or animal body using computed tomography (CT) and other X-ray scanners, nuclear magnetic resonance scanners and ultrasound scanners, to name but a few examples.

The volume data generated by modern scanning equipment can be very detailed and complex to interpret. A physician may wish to render the data using different view directions and from different positions with respect to the scanned object in order to be able to analyze the scanned object and to detect, for example, abnormalities.

Volume rendering techniques, such as applied to slab multi-planar reformatting (MPR) (sometimes referred to as MPR with thickness, or thick MPR), often lead to undesirable artifacts appearing in resulting 2D images. These artifacts are visually distracting and can hinder the interpretation of the images. In some situations the artifacts could be mistaken for real features of the volume data or in other cases could obscure real features of the data. Artifacts can also have a deleterious effect on subsequent image processing. For example, the accuracy of edge-detection algorithms is often very sensitive to the presence of such image artifacts.

Volume data comprises a plurality of voxels arranged in a 3D grid. Each voxel has a voxel value associated with it. The voxel values represent measurements of a physical parameter. For example, in the case of CT scans, the voxel values represent the opacity of those voxels to X-rays, i.e. their X-ray stopping power. X-ray stopping power is measured in Hounsfield units (HUs) which is closely correlated with density (mass per unit volume).

The voxels of volume data acquired by medical imaging devices are in most cases acquired on a Cartesian grid, i.e. the data points are aligned in three orthogonal axes I, J and K. In some special cases, the K axis may not be orthogonal to the I and J axes to take account of gantry tilt or slew. Moreover, the axes are conventionally ascribed a common origin at one corner of the volume. However, it will be appreciated that this choice of origin is arbitrary. These axes define a volume space. A volume-space coordinate system is used to identify the location of each voxel in the volume space. The volume-space coordinate system has unit (or basis) vectors i, j and k which are aligned with respective ones of the orthogonal axes I, J and K. The unit vectors i, j and k are defined such that the voxels are of unit length along each of the axes in volume space. That is to say, the separation between voxels (i.e. the distance between their centers) along each axis is unity.

The 2D image-data comprise a plurality of image pixels arranged in a 2D grid. Although the image itself is 2D, it is helpful to define a 3D view space containing the image. View space is defined by three orthogonal axes X, Y, Z having a common origin at one corner of the image. Again, the choice of origin is arbitrary. The X- and Y-axes are in the plane of the image (the image plane) and are aligned with the 2D grid of image pixels. The Z-axis is aligned parallel with the view axis (i.e. perpendicular to the image plane). A view-space coordinate system is defined to identify the location of each voxel and each image pixel in view space. The view-space coordinate system has unit, or basis, vectors x and y in the image plane and z along the view direction. The unit vectors x and y are defined such that the image pixels are of unit length along each of the axes in view space.

Images may be generated from the volume data using a conventional slab multi-planar reformatting (MPR) technique. In this technique, MPR data are generated by taking a coordinate in view space, transforming the coordinate into volume space, and resampling the volume data using some form of interpolation to generate a new MPR data value for the discrete view space coordinate. An MPR slice is formed by carrying this out for a plurality of {x, y} coordinates at a fixed z value. If this is repeated for multiple values of z, then multiple MPR slices are determined and these slices can be projected to form an MPR slab. The MPR slab thus comprises a series of MPR slices which are aligned parallel to the image plane and disposed at different positions along the Z-axis.

A 2D image for display is formed by projecting (collapsing) the MPR slab along the view direction onto the image plane. This is done according to a projection algorithm. The projection algorithm used in any particular case will depend on the desired appearance of the final image. Three different projection algorithms are commonly used. A first common projection algorithm is based on determining for each image pixel the maximum voxel value seen in the MPR slab along the Z-axis for the XY-coordinate corresponding to that image pixel. This is known as maximum intensity projection (MIP). Maximum intensity projection is a type of ray casting. In effect, for each pixel in the image, an imaginary ray is cast through the volume data parallel to the view direction. The image data for each pixel is then taken to be the maximum voxel value encountered by the ray as it traverses the MPR slab. Another common projection algorithm known as minimum intensity projection (MinIP) uses the minimum voxel value encountered by rays traversing the MPR slab for the image data instead of the maximum. A third type of projection mode used in slab MPR is Average Intensity Projection (AveIP) in which the voxel data values sampled from the portion of the ray traversing the slab are averaged to produce their collective value.

It will be appreciated that in some cases, only voxels having a voxel value in a selected range, or "window" will be of interest. For example, to reveal soft tissue on a CT scan, only voxel values in the range −200 to 500 HU may be of interest. To achieve such a view, a maximum or minimum intensity projection MPR image is typically calculated as described above, and subsequently the image is post-processed to enhance the contrast of voxel values in the desired range and suppress contrast outside that range.

Generally, the view axis will not coincide with one of the volume space axes, i.e. the image plane will have an arbitrary tilt angle with respect to any two of the volume space axes. Consequently sample points along a ray which is cast parallel to the view axis will not coincide with voxel coordinates, but rather each sample point along the ray will lie at arbitrary distances from a plurality of nearby voxel coordinates. Moreover, even if the view direction was along a volume space axis, in the general case each ray would not form a line which cut through a voxel coordinate in each slice of the volume data.

Because of this, when a view axis and a slab orthogonal to the view axis are defined, rays are generated which cut through the slab parallel to the view direction and spaced apart in the plane of the slab in a regular square grid. The rendering application then samples points along the portion of each ray that lies inside the slab, and for each sample point calculates a voxel value based on voxel values of the volume data that lie nearby. For example, for a ray passing almost equidistantly between adjacent voxel coordinates or centers, the average of the eight nearest voxel values, corresponding to the corners of a cube, might be used to arrive at the voxel value for the sample point. In general, a voxel value used for a particular ray passing through the MPR slice will be interpolated from the surrounding voxel values using a weighting based on the distance between the ray and the voxel centers. For example, a tri-linear interpolation between the eight surrounding voxels in the MPR slice is often used. Common interpolation methods include nearest neighbor (1 voxel), tri-linear interpolation (8 voxels), and tri-cubic interpolation (64 voxels).

A common and important type of slab MPR is so-called cine MPR in which the slab is gradually "moved" along the view axis in small increments, so that the user sees a succession of images or frames projected from the volume data, where each frame relates to a projection through a slab occupying a location incrementally different from the previous slab. In use, a radiologist will "cine" the slab back and forth interactively. In some cases, the succession of frames can be stored and then "played back" as a movie. For example, in a CT scan of a human head, a radiologist might take several seconds to traverse the head from top to bottom or back to front, with the traverse involving several hundred frames.

In cine MPR using MIP, MinIP or another non-linear projection function, the presence of noise in the volume data set will result in noise in the output image that changes from frame to frame along the view axis. As a practitioner cines a slab through the volume data set, the noise will cause a shimmering effect. This shimmering effect is distracting and also gives the impression of poor product quality. AveIP is less susceptible to this problem, because the noise is averaged out. Nevertheless AveIP is not entirely free from the shimmering problem, so the process may also be applied with AveIP.

As described above, a typical technique for generating such image frames is casting a ray through the volume data set for each pixel in an image and sampling the volume data sets at a number of discrete points along each respective ray. If using MIP, the maximum voxel value or interpolated value along the ray within the slab is then selected. The selected maximum sample or interpolated value within the slab is taken to be the pixel value associated with its respective ray.

FIG. 1 illustrates schematically a typical technique for producing a frame for cineing volume data. The volume data set 100 represents a volume space having a grid 102. The volume-space is illustrated in two-dimensions and comprises I and J axes, but also includes a third dimension along an axis K, which is perpendicular to the plane of the paper and therefore not visible. The voxel values for the volume data set are taken to be in the centre of each of the smaller squares and have a common origin at one corner of the volume data as illustrated by the dashed cross 104 in the lower left square of the volume space. Only 36 voxel values are illustrated, but it will be appreciated that many more values are typically used, but fewer have been used for illustrative purposes.

An image plane 106 is illustrated in FIG. 1 lying at an angle to the volume data set, i.e. tilted. In other words the image plane is not parallel to the volume data set. As described above, a number of rays 108 are cast from the image plane 106 into the volume data set 100 in a selected view direction parallel to a view axis Z. Each of the rays corresponds to a pixel at the image plane for forming an image. The image plane illustrated is 1-dimensional, for example along an axis X, but in practice the same process will be repeated in a second direction Y out of the plane of the paper. It is noted that in FIG. 1, and later figures of similar format, the K and Y axes are parallel. In reality, the K and Y axes have an arbitrary relationship and will not be aligned. However, to illustrate the principles clearly in a two-dimensional representation, the K and Y axes have been aligned.

A slab 114 is located in the volume-space 100 which is parallel to the image plane 106 and extends along the view axis Z. The slab is a 3D volume that also extends into the plane of the paper. The slab 114 is represented by a dashed rectangle. A number of discrete sample points 116 are selected that lie on each of the rays 108 and within the slab 114, which are illustrated as circles with a regular spacing that corresponds to the spacing of the rays 108. Before the sample points are collapsed or projected onto the image plane to form a 2D image, the values at each of the sample points is determined. For example, sample point 116 is illustrated as lying, by chance, near to the location of a voxel of the experimentally obtained data (i.e., near the centre of the square of the grids lines 102). The sample point 116 can therefore take for its voxel value the voxel value of the experimentally obtained voxel, or some value close to it. More generally, a sample point will not lie at or near to an experimentally obtained voxel location in which case an interpolation method will need to be applied to determine a suitable voxel value for the sample point from the voxel values of nearby experimentally obtained voxels. Sample point 118 depicts in two dimensions a more general case and lies approximately equidistant from four voxel locations. An interpolation method, such as tri-linear interpolation, might be used to obtain the value at the sample point 118. Once the values are obtained for each of the sample points, the sample point can be projected onto the image plane using MIP, for example, to obtain the values for each of the pixels.

FIG. 2 illustrates schematically an incremental movement of the slab from a first location 114 to a second location 120 as occurs during cineing. The incremental nature of the slab movement relative to the slab thickness is such that the majority of the "new" slab lies within the volume of the "old" slab, i.e. the two slabs 114 are 120 are largely overlapping. A new set of MPR planes is computed and projected for the slab 120 in the new position. The sample points of the old slab are shown as circles with a dashed line and the sample points of the new slab are shown circles with a solid line. For example, sample point 116 in the old slab corresponds to a shifted sample point 122 in the new slab. The voxel values in an experimentally obtained volume data set will of course include noise contributions. Because of noise, interpolated voxel values at sample points that are close together, such as sample points 116 and 122, can be significantly different. In the case that MIP is being used and the sample points 116 and 122 lie at the maximum voxel values for the ray in the slab, this will translate into significantly different brightnesses being assigned to the ray from one frame to the next. This is what gives rise to the shimmering effect. In other words, because the MIP result is dominated by a single sample point, even sub-pixel changes to sample point locations can produce significant intensity variations in the final intermediate image. The same is true for MinIP.

FIG. 3 shows a graph of values of sample points for the slabs shown in FIG. 2, along a single ray cast through the volume. The graph shows the sample values in arbitrary units against position along the ray, which is also in arbitrary units. The squares represent the sample points along the ray for the slab 114 at the first location and the triangles represent the sample points along the ray in the slab at the second location 120. Each of the square points and triangle points are spaced apart by 0.25 of a pixel from respective square and triangle sample points.

In FIG. 3, the solid vertical lines 134 and 136 show the boundaries of a slab of thickness τ in the first location and the dashed vertical lines 138 and 140 show the slab moved slightly to the right in a second location, where the size of the slab's movement is very small in relation to the thickness of the slab. However, despite the very small size of the slab movement, the magnitude of the maximum sample value 142 at the first slab position is significantly different from the magnitude of the maximum sample value 144 at the second slab location. As a result, when the user cines the slab through the volume, bright pixels in the MIP image appear to shimmer as the chosen sample points move closer or further from the theoretical maximum. A similar problem arises with MinIP, although in the illustrated example the magnitudes of the respective minimum intensity sample values, which are the two sample points contained in the ring 130, are very similar.

BRIEF DESCRIPTION OF THE DRAWINGS

Embodiments of the invention are now described by way of example only with reference to the following drawings.

DETAILED DESCRIPTION

Figure 1:
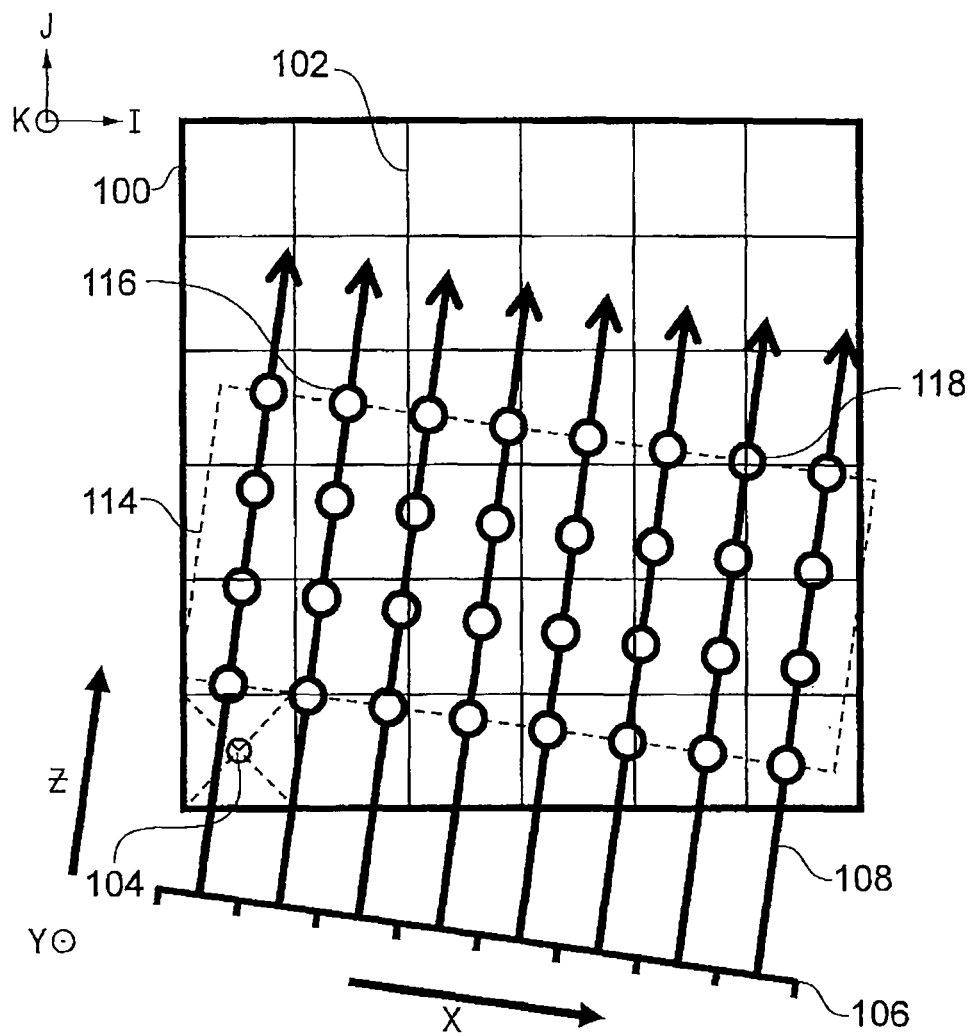
FIG. 1 illustrates schematically a typical technique for producing a slab MPR image.
Figure 2:
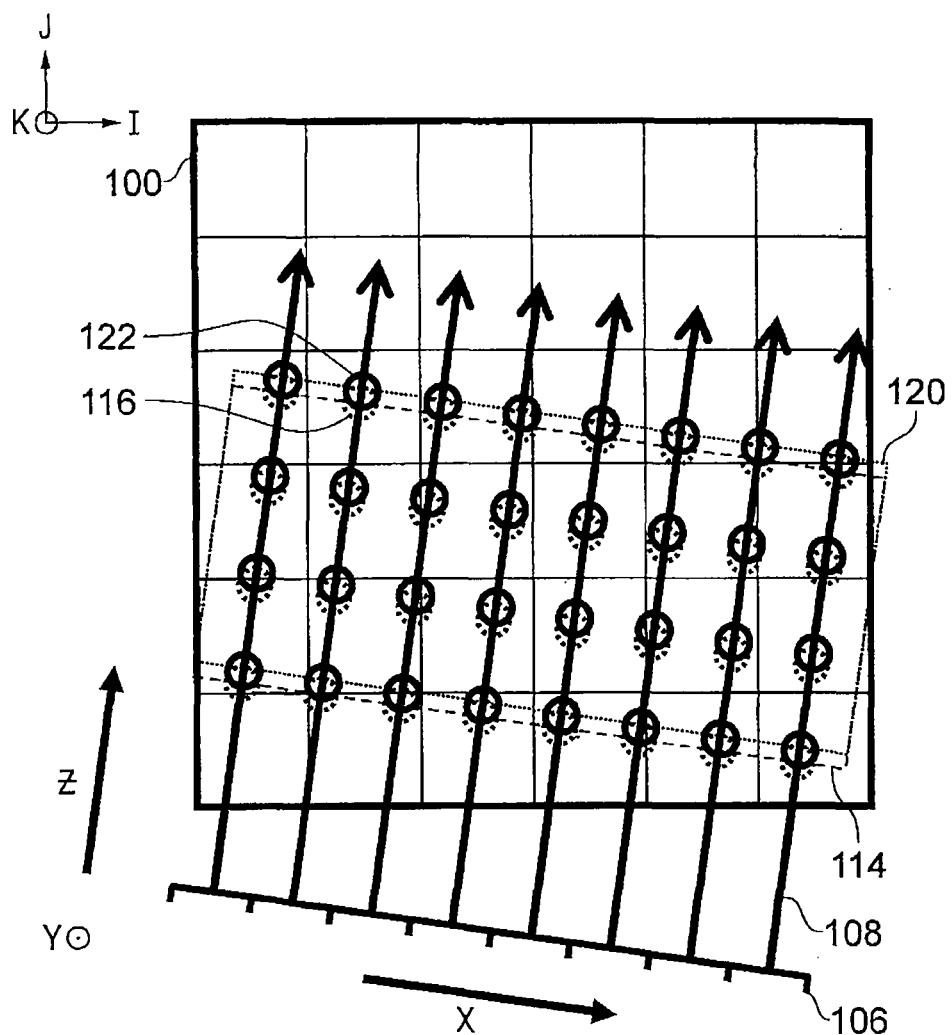
FIG. 2 illustrates schematically a small movement of an MPR slab during cineing.

Certain embodiments of the invention provide a computer system and method of generating a succession of two-dimensional image frames for a slab cine multi-planar reformatting (MPR) process by advancing a slab through a volume defined by a volume data set. The computer system is operable to execute machine readable instructions for carrying out a method comprising: receiving as an input a volume data set defining a volume; specifying a view axis with respect to the volume; advancing a slab of finite thickness through the volume along the view axis in incremental steps, wherein the steps have a step size smaller than the slab thickness, so that when the slab is advanced by one step a fraction of the slab forms an overlap region common to the slab at its previous position and a fraction of the slab forms a new region which was not part of the slab in its previous position; and determining at each slab position an MPR view. The MPR view is determined by: selecting a plurality of sample points along each of a plurality of rays cast through the slab, and performing a projection of the sample points on to an image plane using a projection function. Moreover, at least some of the sample points used for the overlap region are retained from the previous slab position. The sample points from the previous slab position still present in the slab at its current position may be retained. Only sample points not common to the sample points of the previous slab position may be in the new region. The method may comprise outputting an MPR view at each slab position, e.g. for display or storage.

The method can be considered to define the sample points for a given slab MPR cine operation independently from motion of the slab. During a cine operation, redefinition of the set of possible sample points is avoided, and instead previously defined sample point locations are either included or excluded based on whether or not they lie within the current slab locus.

The method can be implemented by fixing the grid that defines the plurality of sample points in volume space, so the grid does not change during any given cine operation. One way to achieve this objective is to set the origin of the sample points to be the origin of the volume data set. Another way is to set the origin of the sample points from the position of the slab at a reference slab position, such as the first slab position of a cine operation.

The method may calculate the values of the sample points using the values of neighboring voxels.

The spacing of the sample points may be the same as a pixel spacing of the MPR view, or an optional intermediate image.

The pixel spacing of any intermediate image may be a multiple of a projected voxel width of the volume data set.

The spacing of the sample points along the view axis may be the lowest of either: the MPR view pixel spacing, any intermediate image pixel spacing, or a projected voxel width of the volume data set.

In some embodiments, the projection function is of the kind that selects a single sample point from the selected sample points based on an attribute of the sample points. For example, the projection function can be a maximum intensity projection function which uses sample magnitude as the sample point attribute, wherein the selected sample point is the one with the maximum magnitude, or a minimum intensity projection function which uses sample magnitude as the sample point attribute, wherein the selected sample point is the one with the minimum magnitude. In other embodiments, the projection function need not be of this kind. For example average intensity may be used, or volume rendering by applying an over operator to points whose color and opacity are a function of the sample magnitude. In volume rendering of this type, a few sample points will tend to dominate, so such data would benefit from application of the present method.

The method may further comprise transforming each MPR view prior to display or storage. This is necessary when the MPR views are made onto an image plane which is an intermediate image plane. A suitable transform may be a warp transform. For example, if an intermediate image is defined that is different (in pixel spacing, orientation or pixel shape) from the MPR view that the user has selected to see, a 2D warp transformation will be needed to form the final image.

The MPR views generated by the method can be stored as individual images or as a succession of frames of a video in a video file. A non-transitory computer program product may be used to store such files. The file can then be retrieved and displayed as desired as a still image or a movie. The MPR views can be stored in DICOM (Digital Imaging and Communications in Medicine) format.

The slab thickness may be fixed, or may be varied, as it is advanced through the volume.

Embodiments of the invention provide a non-transitory computer program product bearing machine readable instructions for carrying out the method according to aspects of the invention.

Embodiments of the invention provide an image acquisition device loaded with and operable to execute machine readable instructions for carrying out the method according to aspects of the invention.

Figure 4:
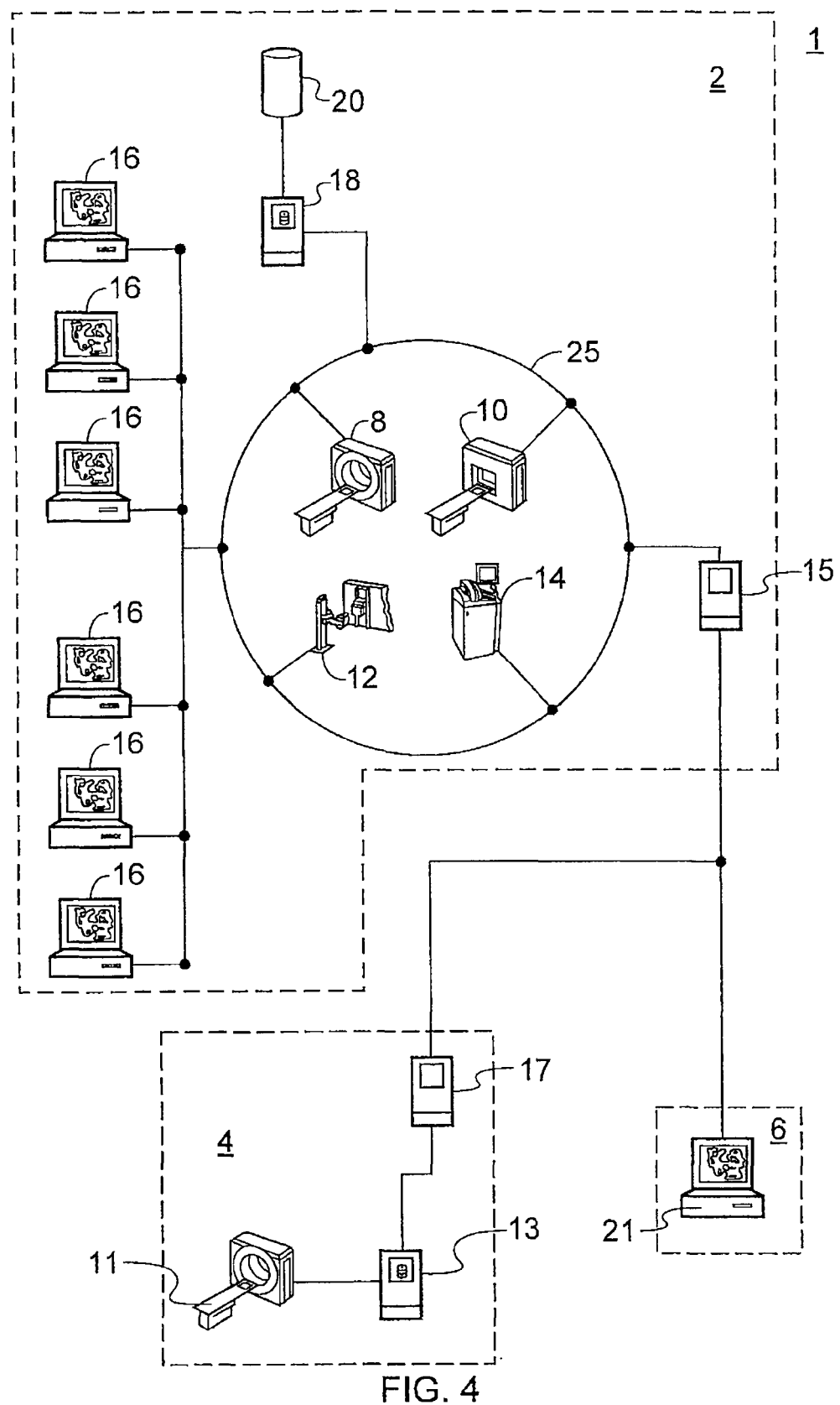
FIG. 4 is a schematic representation of an exemplary network 1 of computer controlled diagnostic devices, stand-alone computer workstations and associated equipment.

FIG. 4 is a schematic representation of an exemplary network 1 of computer controlled diagnostic devices, stand-alone computer workstations and associated equipment. The network 1 comprises three components. There is a main hospital component 2, a remote diagnostic device component 4 and a remote single user component 6. The main hospital component 2 comprises a plurality of diagnostic devices for acquiring patient images, in this example, a CT scanner 8, a MR imager 10, a DR device 12 and a CR device 14, a plurality of computer workstations 16, a common format file server 18, a file archive 20 and an internet gateway 15. All of these features are inter-connected by a local area network (LAN) 25.

The remote diagnostic device component 4 comprises a CT scanner 11, a common format file server 13 and an internet gateway 17. The CT scanner 11 and file server 13 are commonly connected to the Internet gateway 17, which in turn is connected via the Internet to the internet gateway 15 within the main hospital component 2.

The remote single user component 6 comprises a computer workstation 21 with an internal modem (not shown). The computer workstation 21 is also connected via the internet to the internet gateway 15 within the main hospital component 2.

The network 1 is configured to transmit data within a standardized common format. For example, the CT scanner 8 initially generates a source data set, i.e. a 3D image data set, from which an operator may derive an appropriate 2D image. The 2D image is encoded in a standard image data format and transferred over the LAN 25 to the file server 18 for storage on the file archive 20. A user working on one of the computer workstations 16 may subsequently request retrieval of the image. In response, the file server 18 will retrieve it from the archive 20 and pass it to the user via the LAN 25. Similarly, a user working remotely from the main hospital component 2 may also access and transmit data stored on the archive 20, or elsewhere on the network 1. Access may be either within the remote diagnostic device component 4, or within the remote single user component 6.

The software operating on or from the computer workstations 16, 21 is configured to conform to the common image data format. The standardization of the image data format ensures that different software applications on the computers 16, 21, the file servers 13, 18 and file archive 20 and the output from the different computer controlled diagnostic devices 8, 10, 11, 12, 14 can share image data. A user such as a radiologist, a consultant, or a researcher can access any volume data set from the file archive 20 using the computer workstations 16, 21 and generate and display movies or other images, such as a still image of a 3D data set or moving images from a 4D data set.

The methods of this embodiment may usefully be integrated into a stand-alone software application, or with a Picture Archiving and Communication System (PACS). A PACS is a hospital-based computerized network which can store volume data representing diagnostic images of different types in a digital format organized in a single central archive. The most common image data format currently employed for medical applications is the "Digital Imaging and Communications in Medicine" format, usually referred to as DICOM. The DICOM standard is published by the National Electrical Manufacturers' Association of America. Each image has associated patient information.

Figure 5:
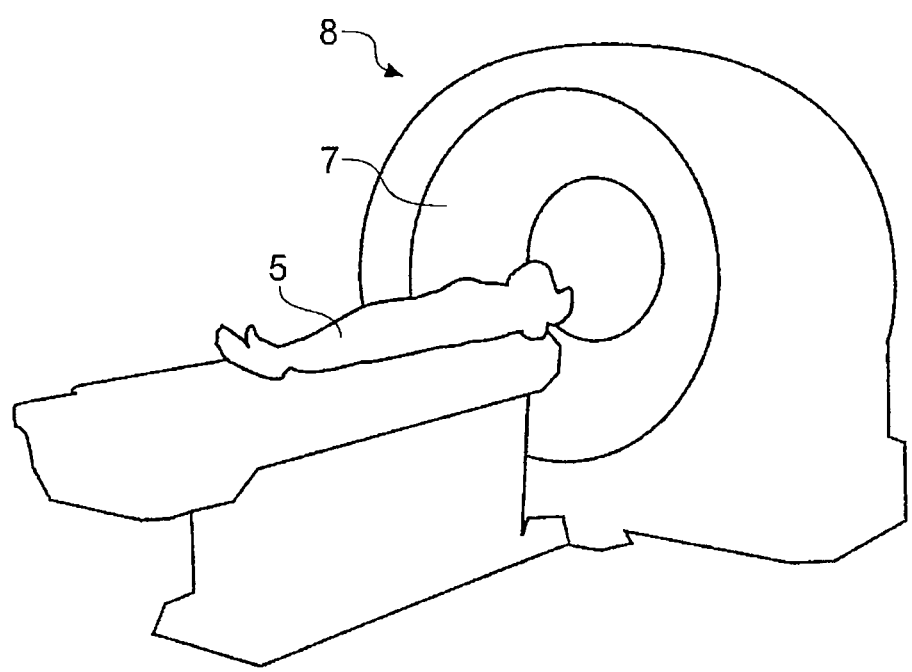
FIG. 5 shows a generic computer-assisted tomography (CT) scanner for generating volume data.

FIG. 5 is a schematic perspective view of a generic scanner, most especially a computer-assisted tomography (CT) scanner 8, for obtaining a 3D X-ray scan of a region of a patient 5. A patient's abdomen including one or more organs or other anatomical features of interest is placed within a circular opening 7 of the scanner 8. A series of image slices through the patient's abdomen is taken. Raw image data are derived from the scanner and could comprise a collection of one thousand 2D 512×512 data subsets, for example. These data subsets, each representing a slice of the region of the patient being studied, are combined to produce volume data. The volume data, which makes up a 3D image data set, comprise a collection of voxels each of which corresponds to a pixel in one of the slices. Thus the volume data are a 3D representation of the feature imaged and various user-selected 2D projections (output images) of the 3D representation can be displayed (typically on a computer monitor).

Figure 6:
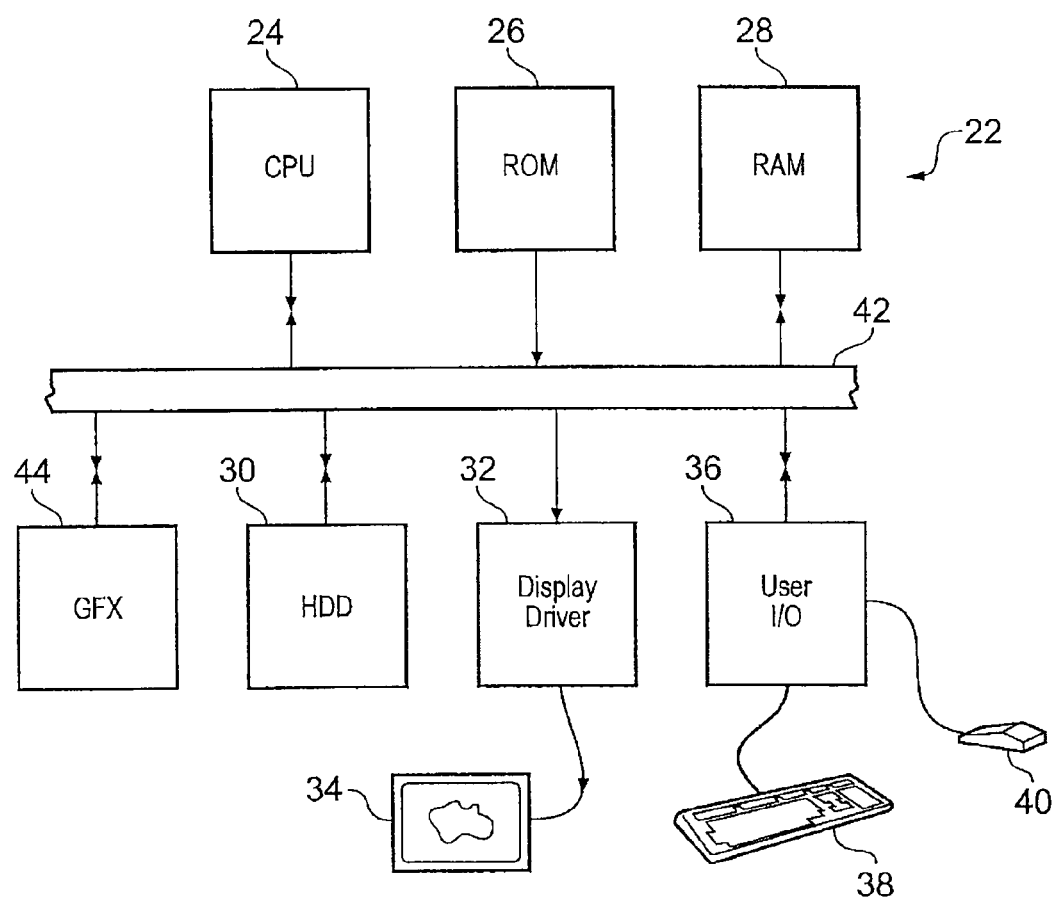
FIG. 6 schematically shows a computer for processing image data.

FIG. 6 schematically illustrates a general purpose computer system 22 configured to perform processing of volume data to generate 2D images. The computer 22 includes a central processing unit (CPU) 24, a read only memory (ROM) 26, a random access memory (RAM) 28, a hard disk drive 30, a display driver 32 and display 34 and a user input/output (IO) circuit 36 with a keyboard 38 and mouse 40. These devices are connected via a common bus 42. The computer 22 also includes a graphics card 44 connected via the common bus 42. The graphics card includes a graphics processing unit (GPU) and random access memory tightly coupled to the GPU (GPU memory) (not shown in FIG. 6).

The CPU 24 may execute program instructions stored within the ROM 26, the RAM 28 or the hard disk drive 30 to carry out processing of signal values associated with voxels of volume data that may be stored within the RAM 28 or the hard disk drive 30. The RAM 28 and hard disk drive 30 are collectively referred to as the system memory. The GPU may also execute program instructions to carry out processing of volume data passed to it from the CPU.

Figure 3:
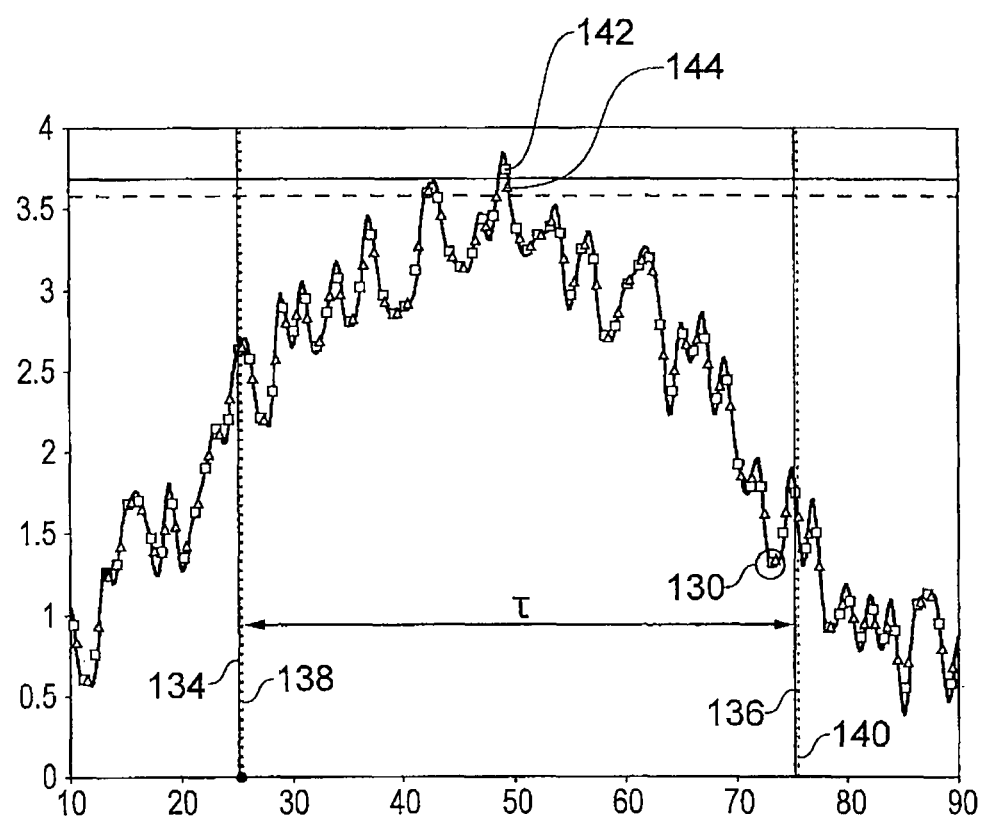
FIG. 3 shows a graph of values of sample points for a ray cast through an MPR slab at a first location and at a second location.
Figure 7:
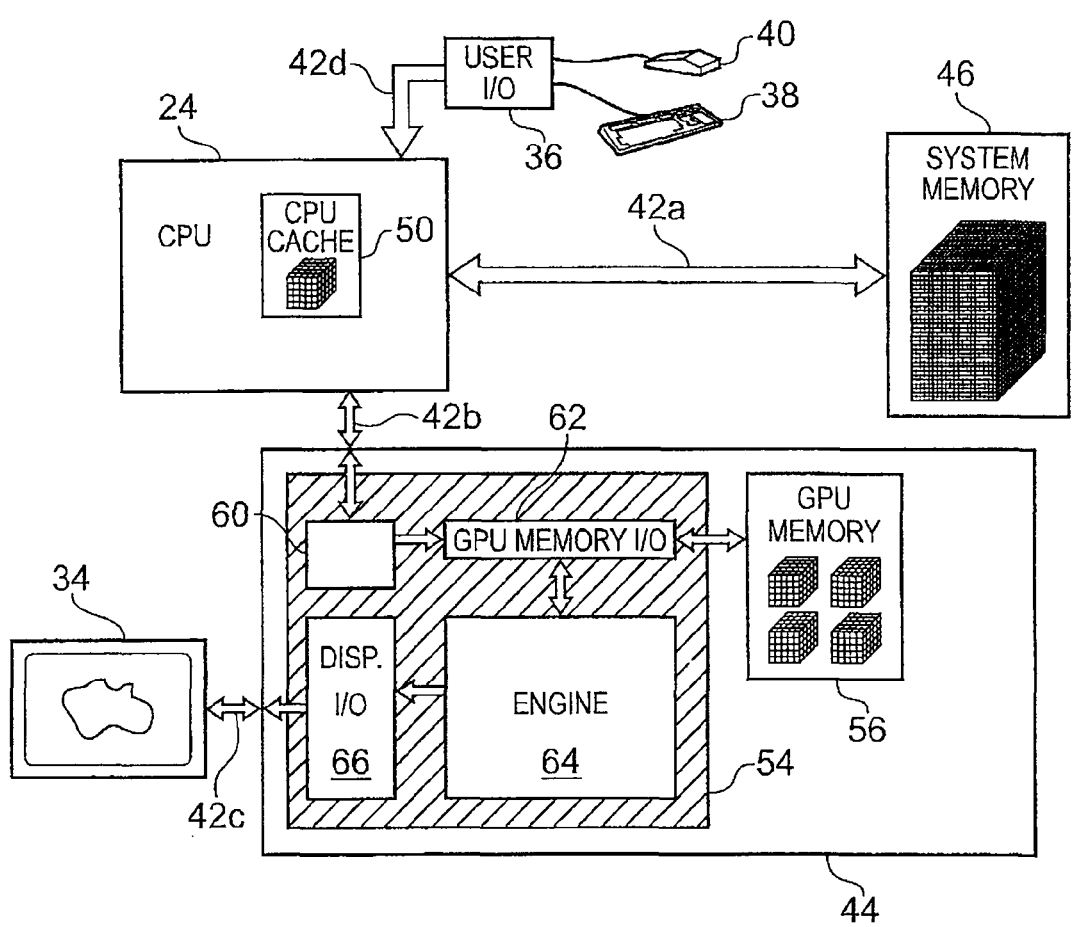
FIG. 7 schematically shows some of the features of the computer of FIG. 6 in more detail.

FIG. 7 schematically shows some of the features of the computer system shown in FIG. 6 in more detail. The RAM 28 and hard disk drive 30 are shown collectively as a system memory 46. Volume data obtained from the scanner 8 shown in FIG. 3 is stored in the system memory as shown schematically. Any suitable form of mass storage device may be used. To assist in showing the different data transfer routes between features of the computer system 22, the common bus 42 shown in FIG. 6 is schematically shown in FIG. 7 as a series of separate bus connections 42*a-d*. A first bus connection 42*a* connects between the system memory 46 and the CPU 24. A second bus connection 42*b* connects between the CPU 24 and the graphics card 44. A third bus connection 42*c* connects between the graphics card 44 and the display 34. A fourth bus connection 42*d* connects between the user I/O 36 and the CPU 24. The CPU includes a CPU cache 50. The graphics card 44 includes a GPU 54 and a GPU memory 56. The GPU 54 includes circuitry for providing an accelerated graphics processing interface 60, a GPU cache I/O controller 62, a processing engine 64 and a display I/O controller 66. The processing engine 64 is designed for optimized execution of the types of program instructions typically associated with processing 3D image data sets and carrying out 3D rendering of such data sets. The processing unit thus comprises CPU and GPU elements.

The user is able to select desired visualization parameters using the keyboard 38 and mouse 40 in combination with a graphical user interface (GUI) displayed on the display 34, for example using a movable screen icon in combination with a mouse, track pad etc. to point and click, a touch screen or other known techniques.

Figure 8:
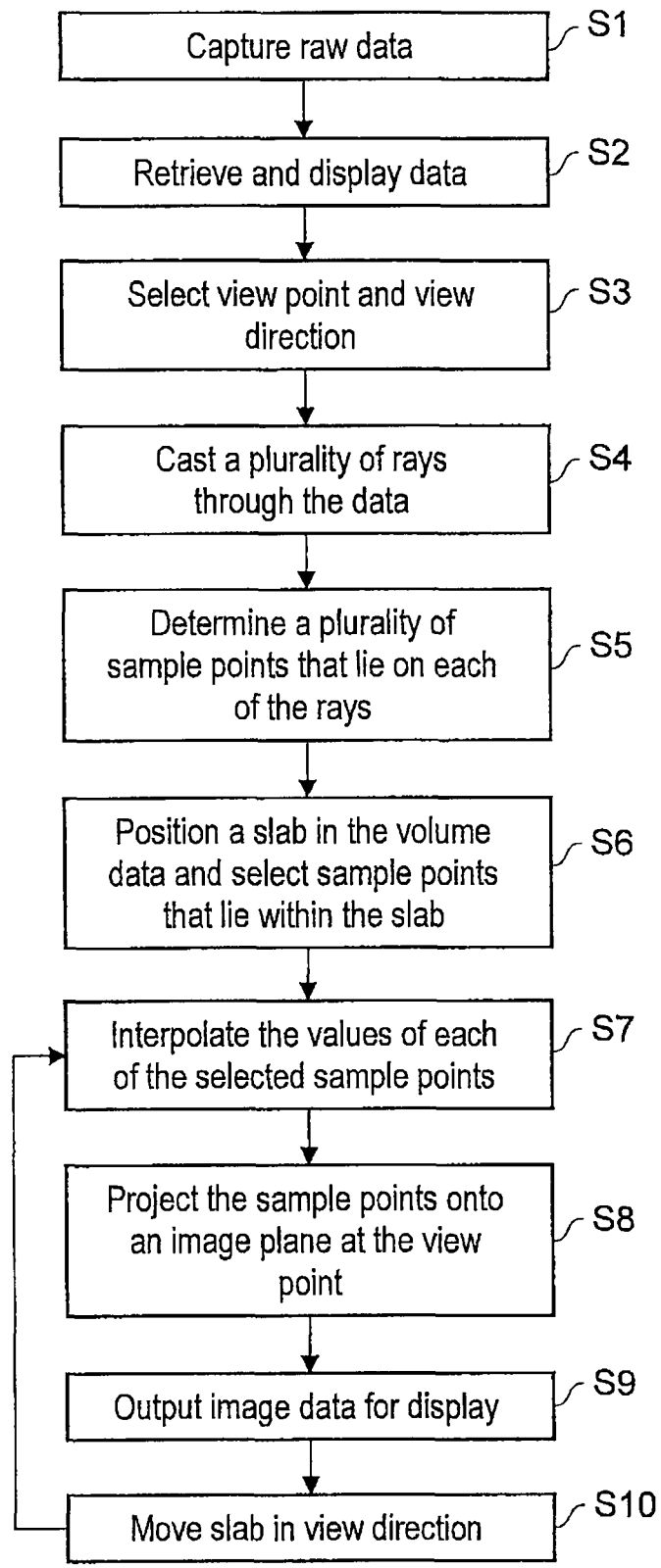
FIG. 8 is an overview of the processing stages in operating an embodiment of the invention to generate successive 2D output images of volume data from a selectable view point and view axis.

FIG. 8 is an overview of the processing stages in operating a first embodiment to generate a succession of 2D image frames for a slab cine multi-planar reformatting (MPR) process, in which a slab is advanced through a volume defined by a volume data set and an MPR view is generated at each position of the slab. The method may execute on a suitably programmed general purpose computer workstation, for example.

In step S1, raw volume data are captured by suitable capture apparatus, and preprocessed and stored. For example, the raw volume data could be captured by the CT scanner 8. The data are pre-processed to generate volume data in the form of a 2D array of voxel values. This may include, for example, normalization from capture apparatus units to conventional units and mapping of data not captured on a regular voxel grid to a regular grid should the program require that images are equally spaced in the image stack. The data may be stored in a random access memory of the capture apparatus for immediate further processing. However, in general the data are stored in a storage device (e.g., file archive 20) for later retrieval and processing. This allows other apparatus, for example remote computer workstations 21 connected to the storage device, to perform the processing at a later time.

The volume data are arranged in rows running parallel to three axes I, J, K which will generally be orthogonal, but in some special cases may not be. For example, the K axis will not be orthogonal to the I and J axes if gantry tilt or slew exists. Neighboring voxels are generally separated along each of the directions corresponding to these axes by unit vectors. That is to say, the distance between voxel centers along each of the axes is unity. However, other examples may arise. In particular, it is relatively common for voxel centers to be spaced differently along the K axis and sometimes not equally spaced.

In step S2, the volume data are retrieved and displayed with an initial configuration based on a default set of visualization parameters on monitor 24 shown in FIGS. 6 and 7, for example. This allows practitioner to view the volume data and select a view point and view direction. It will be appreciated that the volume data may be retrieved an arbitrary time after the data are captured and stored.

In step S3, a desired view point and view direction is defined using conventional techniques. This is typically based on a user selection by a practitioner based on the displayed volume data set. The view direction may also be referred to as a view axis. A view-space coordinate system X, Y, Z is defined in which neighboring pixels in an image for display are separated along the X- and Y-axes by unit vectors x, y and the Z-axis is aligned with the view direction.

The user is able to view the volume data and select the desired view point and view direction using the keyboard 38 and mouse 40 in combination with a graphical user interface (GUI) displayed on the display 34, for example, using a movable screen icon in combination with the mouse, track pad etc. to point and click, a touch screen or other known techniques.

Figure 9:
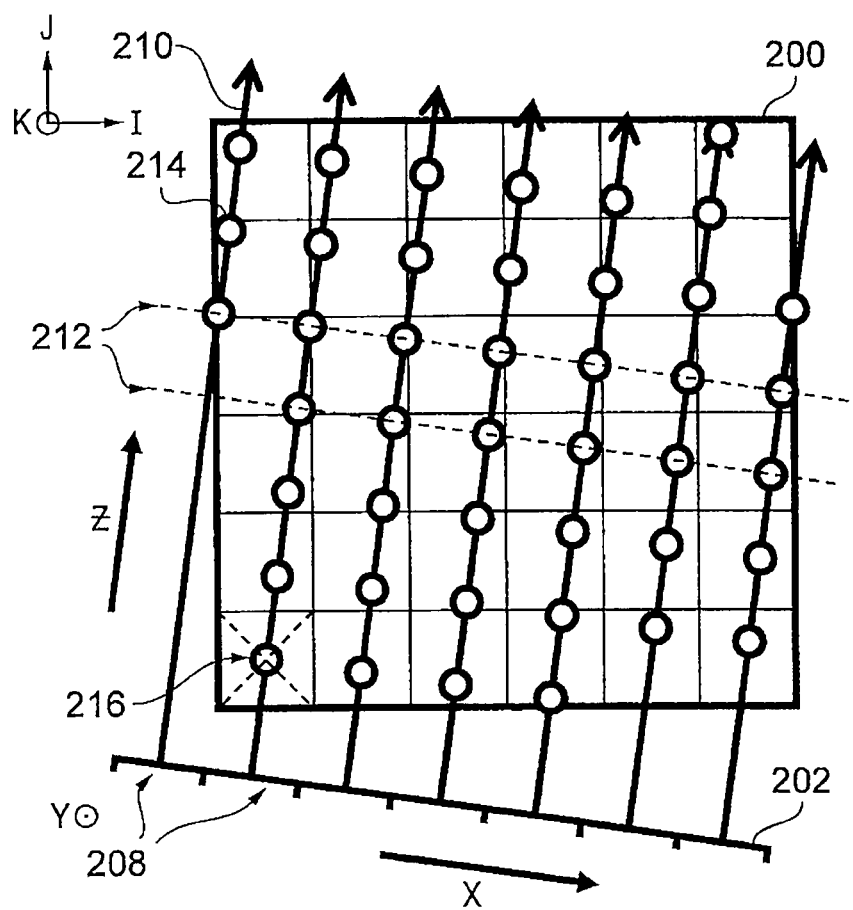
FIG. 9 illustrates schematically the virtual resampling of a volume according to a grid of points defined by the orientation of the intermediate image plane, the pixel spacing of intermediate image space and the origin of volume space.

FIG. 9 illustrates schematically a volume data set 200 arranged in rows running parallel to three orthogonal axes I, J, K, where K is perpendicular to the plane of the page. The desired view direction is illustrated by the image plane 202 having a view-space coordinate system X, Y, Z in which neighboring pixels in the output image are separated along the X- and Y-axes by unit vectors x, y and the Z-axis is aligned with the selected view direction. The X-axis is illustrated by an arrow. The Y axis is out of the page. The location of the pixels 208 in the image plane 202 is illustrated. As previously mentioned, the alignment of the Y and K axes is for the purpose of ease of illustration only.

The image plane 202 may represent an intermediate image plane. Therefore, after an MPR view or image is projected onto the image plane, the resulting image, which may be referred to as an intermediate image, may be processed to form an image for display. For example, a warp transform may be performed on the intermediate image to obtain an image for display. A warp transform may be used because the intermediate image is distorted, rotated or incorrectly scaled, and the warp transform corrects this. Alternatively, the MPR view or image that is projected onto the image plane 202 may be directly displayed. In preferred embodiments, the image projected onto image plane 202 is an intermediate image, which is transformed using known techniques before it is displayed.

To generate an image or MPR view at the image plane 202, the volume data are projected along the view direction or axis (i.e. Z axis). The projection may be made according to any desired projection algorithm. In this example, a maximum intensity projection (MIP) algorithm is used. As noted above, this involves casting a ray from each pixel in the image through the volume data and determining the maximum sample point value. It will be appreciated that the image may be considered a 'real' image in that it comprises processed pixel values, for example, stored in a memory.

In step S4, a plurality of rays is cast from the image plane 202 into the volume data 200 in the view direction parallel to the Z axis. In this example, a ray is cast for each pixel of an image at the image plane 202.

In step S5, a plurality of sample points 214 is determined along each of the rays within the volume data set, which are illustrated as circles and spaced at regular intervals along the rays 210 at the same Z location for each ray, resulting in the regular pattern of sample points shown in FIG. 9. The sample points along each ray at the same Z-position are referred to as being in a single MPR plane 212.

FIG. 9 only illustrates a single plane of the image plane 202, but the same process is repeated for all planes in the Y direction (i.e., in the direction out of the page).

The sample points 214 shown in FIG. 9 are arranged in a coordinate system which is in view space, in the case of there being no intermediate image formed, or in intermediate image space. The coordinate system has the same origin 216 as the origin of the volume data set 200 in this example. The origin is fixed in volume space. The spacing of the sample points in this example is taken to be the same as the pixel spacing of the image at the image plane 202. Alternatively, the spacing of the sample points in the view direction may be the lowest of either the minimum pixel spacing of the image or the projected voxel depth of the volume data set.

In step S6, a slab is positioned in the volume data set and sample points that lie within the slab are selected for further processing.

Figure 10:
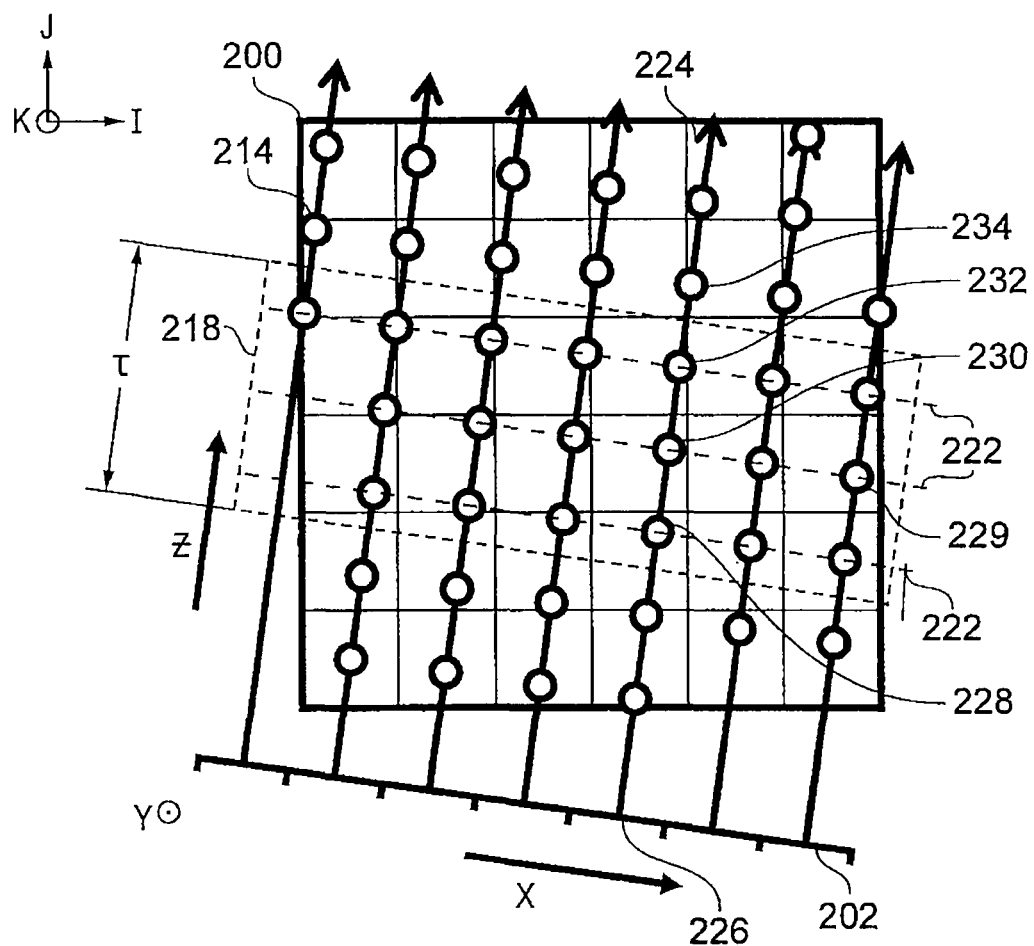
FIG. 10 illustrates schematically the volume data set with a slab positioned within the volume data along the view axis.

FIG. 10 illustrates schematically the volume data set shown in FIG. 9 with the addition of a slab 218. The slab 218 is a volume that is used to select sample points for performing slab MPR. For example, sample point 220 is within the volume of the slab 218 and is used to calculate the value of a pixel in an image at the image plane. The slab 218 is a volume having a thickness τ such that multiple MPR planes 222 are selected. The thickness τ of the slab 218 extends along the view direction or view axis. The length and width of the slab 218 are typically equal to the length and width of the image plane 202.

It will be appreciated that in the example shown in FIG. 10 there are multiple planes extending parallel to the plane of the page, such that each pixel of the image at the image plane 202 will have a ray cast into the volume data set along the view axis. For the purposes of this example, a single pixel and ray are now described. However, it will be appreciated that for each pixel of the image at the image plane 202, the same process is repeated. The pixel spacing of the image plane is illustrated as a multiple of the projected voxel width of the volume data set. However, it will be appreciated that another pixel spacing may be used.

In FIG. 10, 43 sample points and 36 voxels are shown. However, it will be appreciated that more sample points and voxels are typically used, but the number has been reduced for the purpose of simplifying the explanation of the method.

Referring to FIG. 10, ray 224 is selected for processing which corresponds to pixel 226 in the image plane 202. There are multiple sample points along ray 224. However, only sample points 228, 230, 232 lie within the volume of the slab 218, so only these sample points are selected. The other sample points, for example sample point 234, lie outside of the slab 218 and are not used in the subsequent processing for this slab position.

In step S7, the value of each of the selected sample points 228, 230, 232 that lie on the ray 224 and within the slab 218 is obtained. The value of each of the sample points 228, 230, 232 is obtained by interpolating the surrounding voxel values using a weighting based on the distance between the ray and the voxel centers. In this example, a tri-linear interpolation between the eight surrounding voxels in the MPR slice is used. However, other interpolation methods such as nearest neighbor (1 voxel) or tri-cubic interpolation (64 voxels) could be used.

In step S8, a projection algorithm is performed on the interpolated values of the sample points 228, 230, 232 that lie on the ray 224 and within the slab 218. In this example, MIP is performed. However, it will be appreciated that other projection algorithms may be used, for example minimum intensity projection (MinIP) or average intensity projection (AveIP).

The same process of determining the interpolated value for each ray, corresponding to a respective pixel in the image plane is determined. The projection of each pixel value is preferably performed in parallel, but may be performed sequentially.

Figure 11:
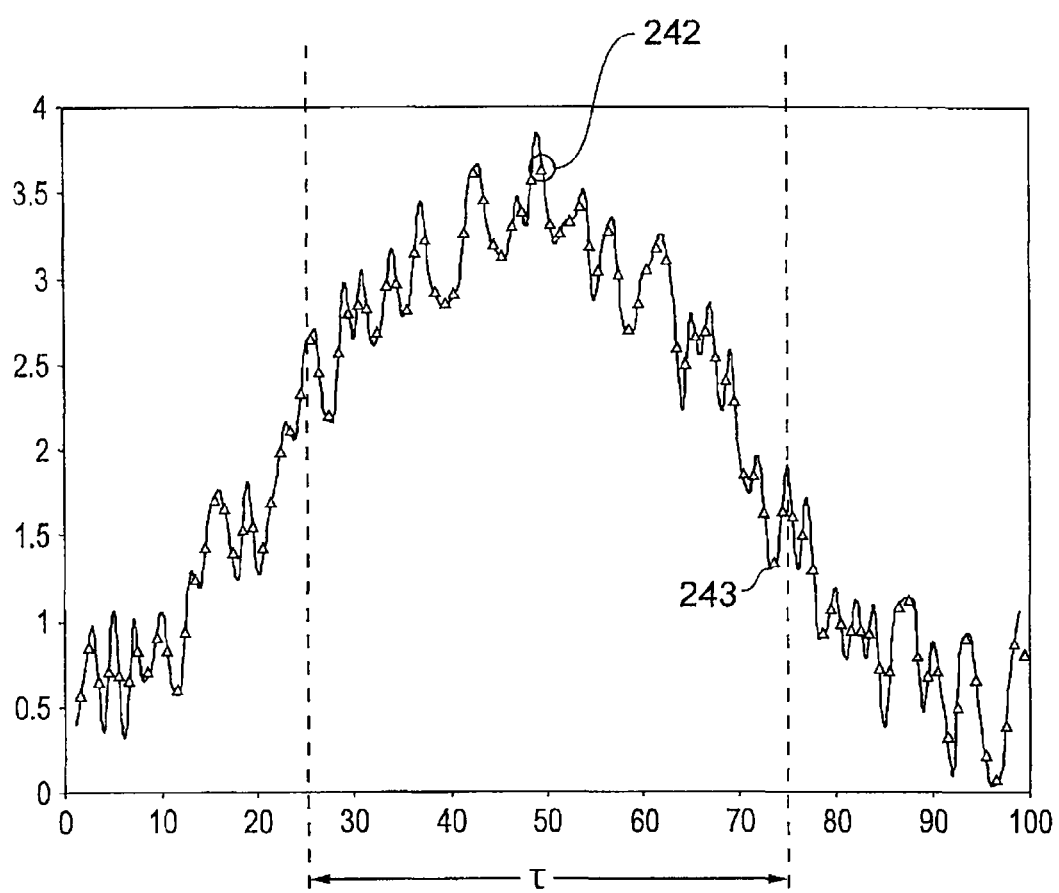
FIG. 11 is a graph of values of sample points for an MPR slab at a first position and an MPR slab at a second position.

FIG. 11 is a graph of interpolated values of sample points taken from synthesized data and illustrates a specific example of the method of the embodiment. The y-axis represents the interpolated values in arbitrary units and the x-axis represents each of a plurality of sample points that lie on a ray cast from a pixel in an image at the image plane through a volume data set. Each sample point is represented as a triangle. It will be appreciated that in the specific example shown in the graph in FIG. 11 there are more sample points than shown in FIG. 10. The graph illustrates a more typical number of sample points that are used, but it will be appreciated that less sample points can be used than in FIG. 11.

In FIG. 11, the extent in the view direction or axis of a slab is illustrated by the dashed vertical lines and the slab has a thickness τ. Each of the sample points that lie between the two vertical dashed lines correspond to the sample points that are selected by the slab for performing the projection on to the image plane to obtain the MPR view or image.

Referring to FIG. 11, applying a MIP to the sample points selected by the slab, sample point 242 has the maximum interpolated value. Applying MiniP to the same slab, sample point 243 has the minimum interpolated value. Therefore, if MIP is used the value of sample point 242 is used as the value of the pixel corresponding to the ray cast through the volume data set. Alternatively, if MiniP is used the value of sample point 243 is used as the value of the pixel corresponding to the ray cast through the volume data set. Accordingly, a MIP function which uses magnitude of the voxel value as the sample point attribute may be used, such that the selected sample point is the one with the maximum magnitude. Alternatively, a MiniP function may be used which uses magnitude of the voxel value as the sample point attribute, such that the selected sample point is the one with the minimum magnitude.

Referring to FIG. 8, In step S9, image data in the form of x, y coordinates and respective pixel value are output for display. As discussed above, the output image data may be directly displayed or may be an intermediate image which is transformed using, for example, a warp transform.

In step S10, the slab 218 is moved or advanced in the view axis or view direction through the volume, wherein the slab is advanced by an incremental step (δI). The sample points that lie within the slab at its new position are selected. The user is able to select or make a desired movement or advancement of the slab 218 along the view axis using the keyboard 38 or mouse 40 in combination with a graphical user interface (GUI) displayed on the display 34, for example using a movable screen slab-icon in combination with the mouse, track pad etc. to point and click, a touch screen or other known techniques.

The method described in conjunction with FIGS. 8, 9, 10 and 11 is for obtaining a single image from the volume data set for a single slab position. The repeated incremental stepwise movement of the slab through the volume along the general direction of the ray will result in successive MPR views or images being obtained. This form of imaging process is referred to as cineing in the art. The size δI of the incremental step advancements of the slab in the view direction is smaller than the slab thickness τ.

Figure 12:
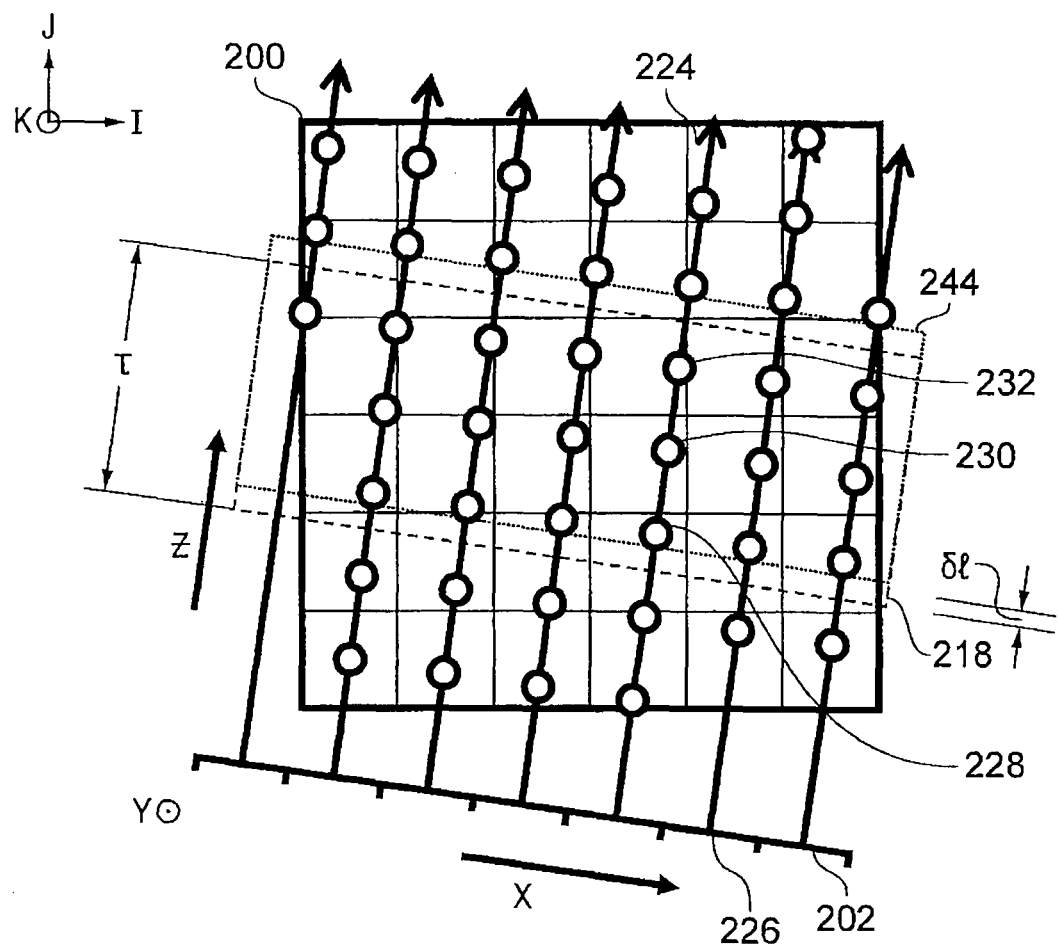
FIG. 12 illustrates schematically the volume data set shown in FIG. 10 with a small shift of the slab position along the view axis.

FIG. 12 illustrates the same volume data set 200 that is shown in FIG. 10. In FIG. 12, the slab 218 (shown with dashed lines) has been moved to a new position 244 (shown with dotted lines) along the view axis Z and sample points lying within the slab volume are selected for processing. Corresponding reference numerals are used in FIG. 12 to those used in FIG. 10. The incremental step advancement of the slab is illustrated by δI, and the thickness of the slab is τ. It can be seen that the size δI of the incremental step advancement of the slab along the view axis is smaller than the slab thickness τ.

It can be seen from FIG. 12 that the new position of the slab 244 contains all the same sample points as in the previous position of the slab 218. The volume that is contained in the slab 218 in the previous position and the slab 244 in the new or current position is referred to as an overlap region. Therefore, in the example shown in FIG. 12 all the sample points from the previous slab position of slab 214 are re-used or retained for the new or current slab position of slab 244

After step S10 is performed, namely the step of advancing the slab through the volume data set 200 along the view axis, the process goes to step S7 to process the selected sample points to obtain an image or MPR view to form the next frame in the cine operation.

Figure 13:
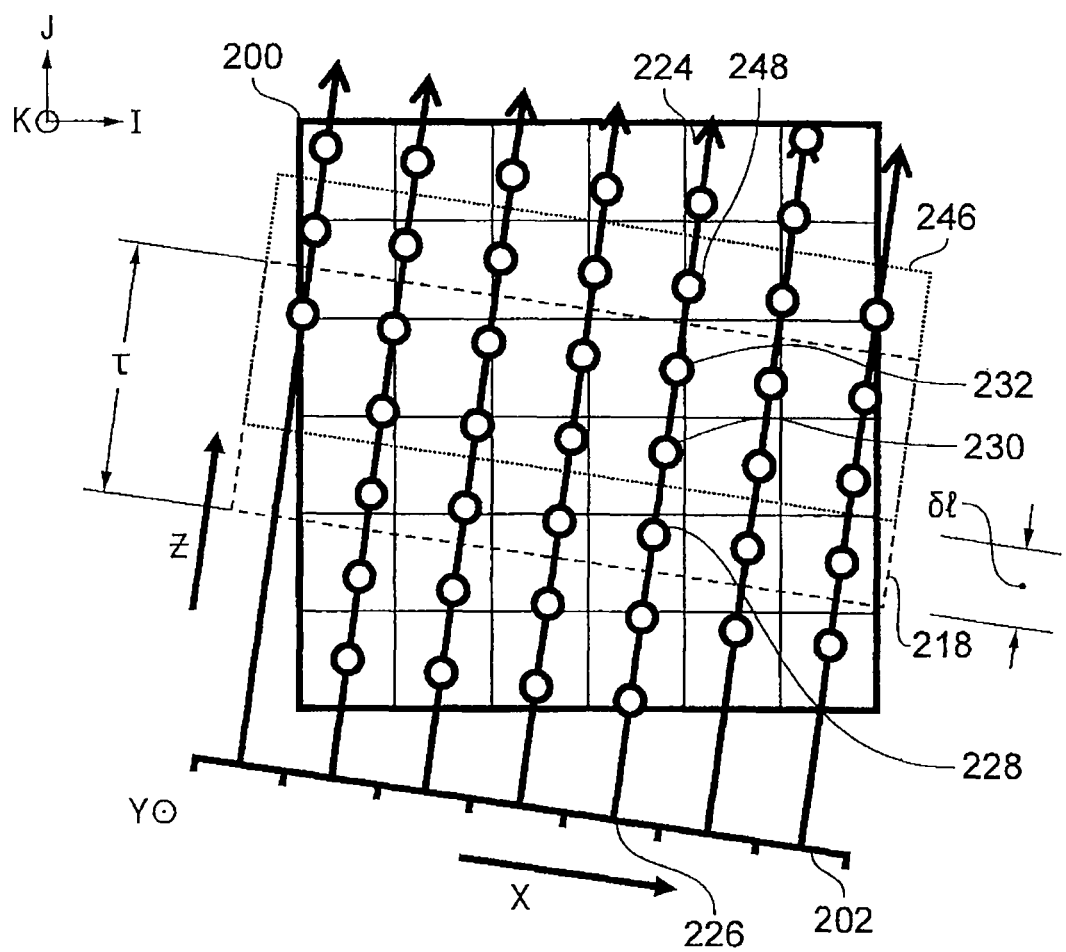
FIG. 13 illustrates schematically the volume data set shown in FIG. 10 with a large shift of the slab position along the view axis.

FIG. 13 illustrates another example where the slab is moved to a new position that includes new sample points that are not within the slab in the previous position and excludes sample points there were within the slab volume in the previous position.

In FIG. 13, the slab is advanced from the previous slab position 218 (shown with dashed lines) to new or current slab position 246 (shown with dotted lines). The advancing of the slab corresponds to step S10 shown in FIG. 8. Once the slab is advanced to its new or current position, the sample points within the slab volume 246 are selected. The slab is advanced through the volume data set along the view axis or direction in incremental steps of size $\delta I$, such that the step size of each advance of the slab is smaller than the slab thickness $\tau$. Therefore, when the slab is advanced by one step a fraction (i.e., $(\tau-\delta I)/\tau$) of the slab forms an overlap region common to the slab at its previous position and a fraction (i.e., $\delta I/\tau$) of the slab forms a new region which was not part of the slab in its previous position.

As discussed above, each of the pixel values is calculated using its respective ray cast through the volume data set. However, for simplicity only a single ray 224 and its respective pixel 226 will be discussed. It will be appreciated that the same process is repeated for all pixels and respective rays for obtaining the MPR view or image at the image plane 202.

The sample points that lie on the ray 224 and within the slab volume of slab 246 are selected, e.g. illustrated sample points 230, 232, 248. It can be seen that one sample point 228 of the ray 224 is no longer in the slab volume 246, so it will not be used for determining the pixel value of pixel 226. Furthermore, a new sample point 248 is selected on ray 224 in the region of the slab which was not part of the slab in its previous position. Two sample points 230, 232 are in an overlap region of the volumes of the slab 218 in the previous position and the slab 246 in the new position. Thus the sample points 230 and 232 are re-used or retained when projecting the selected sample points onto the image at the image plane 202 along ray 224. The process proceeds to step S7 to determine the interpolated values of each of the selected sample points 230, 232, 248.

In step S8, the selected sample points 230, 232, 248 are projected along the ray 224 to generate the pixel value of pixel 226.

The same process of determining the interpolated value for each ray, corresponding to a respective pixel in the image plane is repeated. The projection of each pixel value is preferably performed in parallel, but may be performed sequentially. If multiple CPU cores are available in the processor, then pixel values are projected in parallel, one for each CPU core.

In Step S9, image data in the form of x,y coordinates and respective pixel value for each pixel in the image at the image plane 202 are output for display. Optionally, if a warp from intermediate image space to view space is required, this should also be carried out at this stage in the method prior to display or other output. The process then proceeds to step S10 for another advance of the slab. If no more movements of the slab are detected, the process is terminated.

Figure 14:
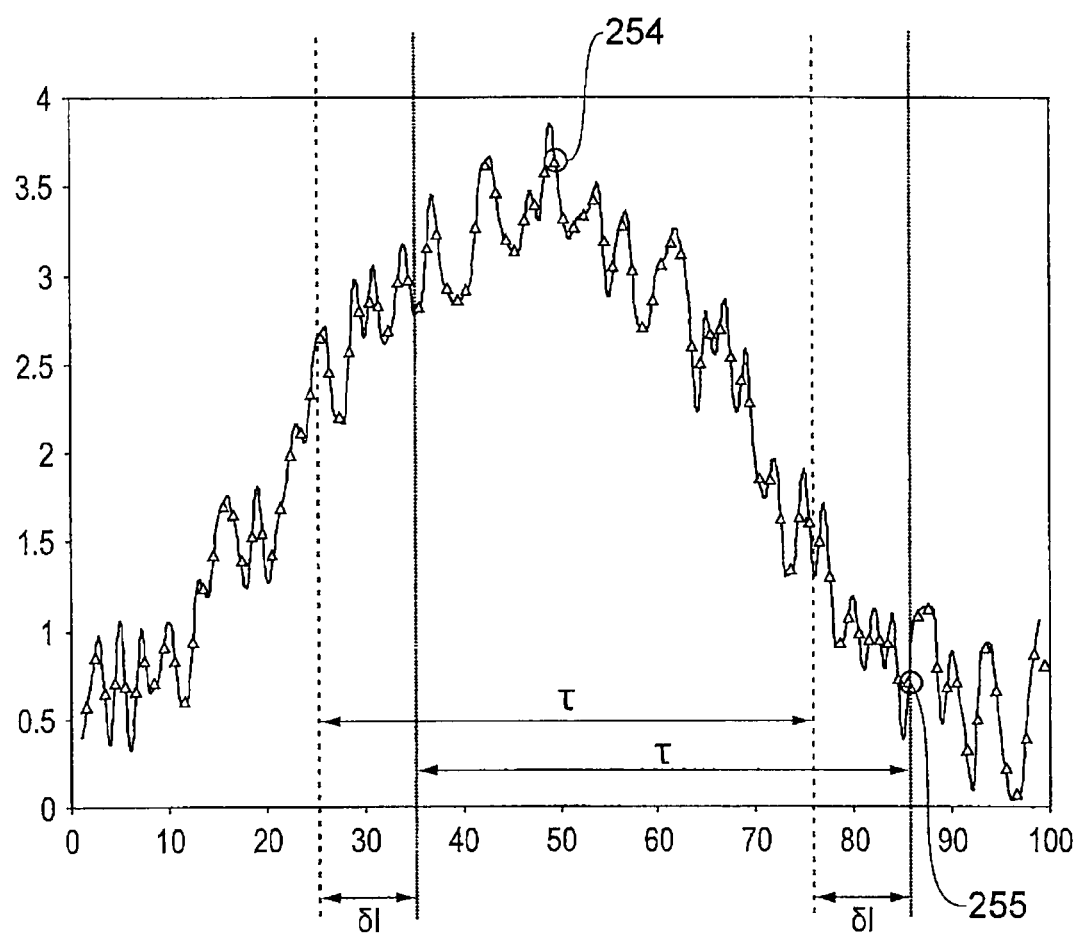
FIG. 14 is a graph of values of sample points for an MPR slab at a first location and a second location following the large shift of the slab illustrated in FIG. 13.

FIG. 14 illustrates the same interpolated values as those shown in FIG. 11 to illustrate a specific example when a slab is advanced an incremental step, as shown in FIG. 13. As in FIG. 11, in FIG. 14 the y-axis represents the interpolated values in arbitrary units and the x-axis represents each of a plurality of sample points that lie on a ray cast from a pixel in the image at the image plane through a volume data set. In FIG. 14, a slab at the previous position is represented by the vertical dashed lines and the slab when advanced to a new or current position is represented by the vertical dotted lines. The thickness ($\tau$) of the slab and the incremental step advancement ($\delta I$) of the slab is also illustrated. The sample points are projected along the ray to obtain a pixel value. According to MIP, sample point 254 is selected as having the maximum value. According to MiniP, sample point 255 is selected as having the minimum value. If MIP is used as the projection function, the value of sample point 254 is taken to be the pixel value in the image or MPR view.

In a second embodiment, the sample points are defined after a slab is positioned in the volume data set. In the second embodiment, a view point and a view direction are selected, and a slab is advanced by incremental steps in the view direction along a view axis though the volume data. In the second embodiment, the rays are cast from each of the pixels of the image at the image plane at the view point when a slab is placed at a first slab position. Suitable sample points are generated that lie within the slab at the first slab position and along each of the plurality of rays. The same process used in the first embodiment is used for determining the value of each of the sample points and projecting the selected points onto the image plane in the second embodiment.

In the second embodiment, when the slab is advanced to a new position, rays are cast from each of the pixels of the image at the image plane at the view point and sample points are generated that lie within the slab at the new or second slab position and on each of the plurality of rays. The slab is advanced an incremental amount that is less than the thickness of the slab, such that the slab at the first or previous location overlaps a portion of the slab at the second or new position. The overlap portion is referred to as an overlap region. In the second embodiment, the sample points in the overlap region are re-used or retained. In other words, the location of each of the sample points in the overlap region does not change. Sample points in the non-overlap region, or the region of the slab at the new position that does overlap with the slab at the previous location, are selected. Any sample points in a region of the previous slab that are not in the region of the slab at the new position are not used or are deselected. The relative location of any newly selected sample points may be referenced to one of the sample points in the slab at the first position. Alternatively, the origin of the slab at the first position may be taken as the origin for all selected sample points.

Comparing, the first and second embodiment, they differ in how the origin of the grid of sample points is chosen. In the first embodiment, the origin is derived from a predefined characteristic of the volume, such as the volume space origin or the centre of the volume. In the second embodiment, the origin is an arbitrary point defined by some aspect of the initial or intermediate positioning activity, such as placing the slab.

In the above description of the first and second embodiments, all the sample points that are within the overlap region of the slab in the previous position and the current position are re-used. In other embodiments, not all of the sample points in the overlap region are re-used. Instead, only a majority fraction of the sample points in the overlap region are re-used. For example, greater than 95, 90, 80, 70 or 60 percent of the sample points in the overlap region are re-used or retained. This will not generally provide complete suppression of the shimmering artifacts described above, but some benefit will be gained.

In the first and second embodiments, if the slab is advanced an incremental step in the view direction such that no new sample points are selected within and no previously used sample points are excluded from the slab in the new position, the process omits or skips steps S7, S8 and goes straight to step S9 so that the same image from the previous slab position is output as the image for the current or new slab position. Alternatively, if the image generated from the slab at the previous position and the slab at the current or new position are the same, because the same sample points are used, the process may go to straight to step S10 and wait for the slab to be moved. In this case no image is generated or outputted.

In the first and second embodiments, each image that is generated is outputted to the display 34. Each of the outputted images forms a frame in a video or cine. Alternatively, the image data for each image may be stored and retrieved at an arbitrary time later. The image data may be stored locally, for example, in the mass storage device HDD 30 of FIG. 6, the ROM 26 of FIG. 6, the RAM 28 of FIG. 6 and the system memory 46 of FIG. 6, and the servers 13, 18 of FIG. 4 or in the file archive 20. Each image may also be stored and displayed at the same time, such that the images may be retrieved from memory at an arbitrary time later. Furthermore, each of the images may be stored individually or as a series of successive images as a video file that are viewed one after the other to form frames of a movie.

Certain embodiments of the invention provide a method of generating a succession of two-dimensional image frames for a slab multi-planar reformatting (MPR) process by advancing a slab through a volume defined by a volume data set, the method comprising: receiving as an input a volume data set defining a volume; specifying a view axis with respect to the volume; specifying a slab motion which moves the slab from a first slab region to a second slab region, the first and second slab regions having a common sub-region; determining a plurality of sample point positions based on the view axis so that the position of first sample points and second sample points in the common sub-region that overlaps the first slab region and the second slab region respectively is same position before and after the slab motion; and performing a projection using the position of sample points and the volume data set. The sample point positions can be changed when the view axis is changed, e.g. between cineing operations.

Embodiments of the invention may include incorporating the methods and associated computer programs described herein as a component in a volume rendering application. Embodiments of the invention may include a computer program product bearing machine readable instructions for carrying out the method as disclosed.

Embodiments of the invention may include a computer loaded with and operable to execute machine readable instructions for carrying out the method as disclosed.

Embodiments of the invention may include an image acquisition device loaded with and operable to execute machine readable instructions for carrying out the method disclosed.

A computer program product is disclosed. Examples of a computer program product bearing machine readable instructions for carrying out the method described above are the mass storage device HDD 30 of FIG. 6, the ROM 26 of FIG. 6, the RAM 28 of FIG. 6 and the system memory 46 of FIG. 7, and the servers 13, 18 of FIG. 4. Other forms of computer program product include a spinning disk based storage device such as a CD or DVD, or a USB flash memory device.

Examples of a computer loaded with and operable to execute machine readable instructions for carrying out the method described above are the computer of FIG. 6, the computer of FIG. 7, and individual elements, e.g. terminals or collective multiple elements of the computer network system shown in FIG. 4, e.g. one of the servers 13, 18 in combination with one or more of the terminals or computers provided with the medical imaging devices.

Examples of a computer program product bearing machine readable instructions for carrying out the method described above are the mass storage device HDD 30 of FIG. 6, the ROM 26 of FIG. 6, the RAM 28 of FIG. 6 and the system memory 46 of FIG. 6, and the servers 13, 18 of FIG. 4. Other forms of computer program product include a spinning disk based storage device such as a CD or DVD, or a USB flash memory device.

While the method has been described with reference to 3D image data sets collected by computer-assisted tomography (CT) scanners, it is more generally applicable to imaging of other 3D data sets and also so-called 4D data sets, i.e. time sequences of volume image data sets. For example, the method may be applied to other imaging types used in the medical field, referred to as modalities. In particular, the methods described herein may be applied to magnetic resonance (MR) images.

While certain embodiments have been described, these embodiments have been presented by way of example only, and are not intended to limit the scope of the inventions. Indeed, the novel methods, computers, computer program products and image acquisition devices described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A computer system operable to generate a succession of two-dimensional image frames for a slab cine multi-planar reformatting (MPR) process by advancing a slab through a volume defined by a volume data set, the computer system comprising:
    a storage circuitry for storing volume data sets defining respective volumes; and
    a processor circuitry operable to execute machine readable instructions to:
    load a volume data set defining a volume from the storage circuitry;
    receive a view axis setting with respect to the volume;
    define a plurality of sample points in the volume which lie along a plurality of rays projected parallel to the view axis, wherein each of the sample points is a location in 3D space;
    advance a slab of finite thickness through the volume along a view axis in incremental steps, wherein the steps have a step size smaller than the slab thickness, so that when the slab is advanced by one step a fraction of the slab forms an overlap region common to the slab at its previous position and a fraction of the slab forms a new region which was not part of the slab in its previous position; and determine at each slab position an MPR view, wherein the MPR view is determined by:

selecting those sample points that lie within the slab from the plurality of defined sample points, and performing a projection of the selected sample points on to an image plane using a projection function, wherein the processor circuitry retains the selected sample points that lie within the overlap region from the previous slab position when determining the MPR view for the current slab position.

2. The computer system according to claim 1, wherein all sample points from the previous slab position still present in the slab at its current position are retained.

3. The computer system according to claim 1, wherein the only sample points not common to the sample points of the previous slab position are in the new region.

4. The computer system according to claim 1, comprising outputting an MPR view at each slab position to a display circuitry or storage circuitry.

5. The computer system according to claim 1, wherein the projection function is of the kind that selects a single sample point from the selected sample points based on an attribute of the sample points.

6. The computer system according to claim 5, wherein the projection function is a maximum intensity projection function which uses magnitude of a voxel value as a sample point attribute, wherein the selected sample point is one with a maximum magnitude.

7. The computer system according to claim 5, wherein the projection function is a minimum intensity projection function which uses magnitude of a voxel value as a sample point attribute, wherein the selected sample point is one with a minimum magnitude.

8. The computer system according to claim 1, further comprising transforming each MPR view prior to display on a display circuitry or storage in a storage circuitry.

9. An image acquisition circuitry comprising a computer system according to claim 1.

10. A method of generating a succession of two-dimensional image frames for a slab cine multi-planar reformatting (MPR) process by advancing a slab through a volume defined by a volume data set, the method comprising:

receiving as an input a volume data set defining a volume;

specifying a view axis with respect to the volume;

defining a plurality of sample points in the volume which lie along a plurality of rays projected parallel to the view axis, wherein each of the sample points is a location in 3D space;

advancing a slab of finite thickness through the volume along a view axis in incremental steps, wherein the steps have a step size smaller than the slab thickness, so that when the slab is advanced by one step a fraction of the slab forms an overlap region common to the slab at its previous position and a fraction of the slab forms a new region which was not part of the slab in its previous position; and determining at each slab position an MPR view by:

selecting those sample points that lie within the slab from the plurality of defined sample points, and performing a projection of the selected sample points on to an image plane using a projection function, wherein the selected sample points that lie within the overlap region are retained from the previous slab position.

11. The method according to claim 10, wherein all sample points from the previous slab position still present in the slab at its current position are retained.

12. The method according to claim 10, wherein the only sample points not common to the sample points of the previous slab position are in the new region.

13. The method according to claim 10, comprising outputting an MPR view at each slab position.

14. The method according to claim 10, wherein the projection function is of the kind that selects a single sample point from the selected sample points based on an attribute of the sample points.

15. The method according to claim 14, wherein the projection function is a maximum intensity projection function which uses magnitude of a voxel value as a sample point attribute, wherein the selected sample point is one with a maximum magnitude.

16. The method according to claim 14, wherein the projection function is a minimum intensity projection function which uses magnitude of a voxel value as a sample point attribute, wherein the selected sample point is one with a minimum magnitude.

17. The method according to claim 10, further comprising transforming each MPR view prior to display or storage.

18. A non-transitory computer program product bearing machine readable instructions for carrying out the method of claim 10.

* * * * *